United States Patent
Rho et al.

(10) Patent No.: US 7,934,518 B2
(45) Date of Patent: May 3, 2011

(54) DETECTING DEVICE FOR VALVE OPENING-CLOSING

(75) Inventors: Byoung-Hoo Rho, Daejeon (KR); Mun-Su Bok, Daejeon (KR); Ki-Jong Jin, Chungcheongnam-Do (KR); Jae-Chul Lee, Daejeon (KR); Jung-hwan Lim, Daejeon (KR)

(73) Assignee: RPM Tech Co., Ltd., Daejeon (KR)

( * ) Notice: Subject to any disclaimer, the term of this patent is extended or adjusted under 35 U.S.C. 154(b) by 0 days.

(21) Appl. No.: 12/177,148

(22) Filed: Jul. 24, 2008

(65) Prior Publication Data

US 2009/0322359 A1    Dec. 31, 2009

(51) Int. Cl.
*F16K 37/00*  (2006.01)
*F17D 3/01*   (2006.01)
*G01B 7/30*   (2006.01)
*G01R 33/025* (2006.01)

(52) U.S. Cl. ............... 137/554; 324/207.25; 324/207.12
(58) Field of Classification Search .................. 137/554; 324/207.12, 207.25
See application file for complete search history.

(56) References Cited

U.S. PATENT DOCUMENTS

| | | | | |
|---|---|---|---|---|
| 3,743,853 A | * | 7/1973 | Dittman et al. | 307/116 |
| 5,079,509 A | * | 1/1992 | Marsh | 324/115 |
| 6,079,441 A | * | 6/2000 | Miller et al. | 137/554 |
| 6,343,615 B1 | * | 2/2002 | Miller et al. | 137/202 |
| 7,556,753 B2 | * | 7/2009 | Uchiyama et al. | 264/40.1 |

* cited by examiner

*Primary Examiner* — Stephen M Hepperle
*Assistant Examiner* — Atif H Chaudry
(74) *Attorney, Agent, or Firm* — LRK Patent Law Firm

(57) ABSTRACT

Disclosed is a device for sensing the opening degree of a valve, which can easily determine the upper and lower limits without using upper and lower limit switches so that, besides simplifying the mechanical structure, the device can be easily installed, maintained, and repaired. The device can avoid basic errors and improve the opening degree sensing performance without using upper and lower limit switches, cams, and a spline so that, by simplifying the mechanical structure, the device can be manufactured, installed, maintained, and repaired at a low cost, and its long-term durability is improved. The device has a main gear adapted to disengage from the meter gear when the main gear is rotated excessively so that any damage to the meter gear and potentiometer, which may occur during installation or use, is prevented.

3 Claims, 7 Drawing Sheets

DETECTING DEVICE FOR VALVE OPENING-CLOSING

BACKGROUND OF THE INVENTION

1. Field of the Invention

The present invention relates to a device for sensing the opening degree of a valve, and more particularly to a device for sensing the opening degree of a valve, which can easily determine the upper and lower limits without using upper and lower limit switches so that, besides simplifying the mechanical structure, the device can be easily installed, maintained, and repaired.

2. Description of the Prior Art

As generally known in the art, a valve opening degree sensing device is connected to a valve, which adjusts the flow of a fluid (e.g. air, water, oil), and senses the movement of the valve. The user checks the operating condition of the valve measured by the valve opening degree sensing device, and adjusts the flow of the fluid by controlling the operation of the valve at a desired level. The application of a valve and a valve opening degree sensing device ranges from large facilities (e.g. oil pipelines) to small devices (e.g. mixed air supply devices of automobiles and motorcycles).

A conventional valve device has a valve installed inside a pipe-shaped tube, through which a fluid is transferred, and the transfer of the fluid is controlled by opening/closing the valve. To this end, the valve is connected to a valve driving device via a shaft, which extends through the pipe to connect the valve and the driving device. The driving device or the shaft is connected to an opening degree sensing device, which senses the degree of opening based on the movement of the driving device or the rotation of the shaft. The driving device and the opening degree sensing device are connected to a control panel, which adjusts the opening/closing of the valve by remote control or by the user.

FIG. 1 shows the brief construction of a conventional valve, a valve driving device, and an opening degree sensing device.

Referring to FIG. 1, a valve 3 is installed inside a pipe 1, through which a fluid is transferred, to adjust the amount of transferred fluid. The valve 3 is driven by a shaft 5, which is coupled to the valve 3 through the pipe 1. To this end, the shaft 5 is mechanically coupled to the driving device 10. The driving device 10 includes an actuator 7 (or motor) for providing the shaft 5 with physical driving force, and a controller 9 for controlling the actuator 7. An opening degree sensing device 11 is installed on an end of the shaft 5 to detect the degree of rotation of the shaft 5 and display it. To this end, the opening degree sensing device 11 includes a sensor 13 and a beacon 15 for displaying the degree of opening.

FIG. 2 is a top view briefly showing the interior of the opening degree sensing device, and FIG. 3 is a lateral view briefly showing the interior of the opening degree sensing device.

Referring to FIGS. 2 and 3, the conventional opening degree sensing device 13 includes a main gear 17, cams 19 (19a and 19b), upper and lower limit switches 21 (21a and 21b), and a potentiometer 25. The main gear 17 is coupled around the shaft 5. A meter gear 23, which has a predetermined gear ratio with regard to the main gear 17, is installed and positioned to engage with the main gear 17 so that rotation of the shaft 5 is transferred to the meter gear 23 via the main gear 17. The meter gear 23 is connected to the potentiometer 25 by a meter shaft 27 to transmit rotation of the main gear 17 to the potentiometer 25. The potentiometer 25 generally consists of a variable resistor, which changes the voltage or current as the meter gear 23 rotates and which displays the change (i.e. degree of opening) to the outside.

The valve 3 shown in FIG. 1 is rotated about 90° inside the pipe 1 to adjust the flow rate. As a result, the main gear 17 rotates about a quarter turn in the forward or backward direction, and the meter gear 23 rotates by a predetermined amount. The valve 3 switches between a closed condition, in which it blocks the pipe 1 and allows no fluid movement, and a fully open condition, in which the valve 3 is fully open and maximizes the fluid movement. In order to efficiently adjust and sense the closed and fully open conditions, the opening degree sensing device 13 is provided with means for controlling or sensing the open/closed condition of the valve when it is in the closed condition (i.e. when the rotational angle is about 0°) and when it is in the fully open condition (i.e. when the rotational angle is about 90°). Particularly, upper and lower limit switches 21 and cams 19 are used to recognize the closed and fully open conditions, as shown in FIGS. 2 and 3. The upper and lower limit switches 21 include an upper limit switch 21a and a lower limit switch 21b. Respective switches 21 match with a pair of cams 19 coupled to the shaft 5. The cams 19 installed on the shaft 5 are installed to contact different switches 21 when the valve angle is about 0° and 90°, respectively. Particularly, the second cam 19b presses the switch lead 22 of the lower limit switch 21b when the valve angle is about 90°, and the first cam 19a presses the switch lead 22 of the upper limit switch 21a when the valve angle is about 0°. When the switch leads 22 of the upper and lower limit switches 21 are pressed by the cams 19 in this manner, the driving device 11 stops driving the valve 3 to prevent excessive rotation of the valve 3. This prevents the valve from being damaged, and controls the flow rate at the maximum or minimum level. To this end, a toothed spline 29 is formed on the shaft 5 to couple the cams 19 to the shaft 5 in a reliable and easy manner.

However, the conventional opening degree sensing device has a problem in that its installation, maintenance, and repair are difficult, the upper and lower limits must be determined manually, the error ratio is high, and the output type is limited. More particularly, use of mechanical upper and lower limit switches requires that the valve must be correctly positioned before installing the cams. In the case of incorrect installation, the measurement range is reduced, or a partially open condition is frequently mistaken for a closed condition, which makes the fluid control difficult.

The mechanical upper and lower limit switches, cams, and spline are worn down by long-period driving, and their maintenance and repair degrade user convenience. Furthermore, there is no general method for compensating for the clearance of each existing device. In other words, the clearance must be corrected manually by the user. There are even a number of components, including the spline 29 and cams 19, the clearance of which is not easily reduced. This makes it difficult to improve measurement precision. In addition, there is no method for sensing the degree of opening based on consideration that the clearance increases as the valve 3, driving device 10, and sensing device 11 are used for a long period of time while undergo mechanical wear. Therefore, it is necessary to develop an opening degree sensing device which solves the above-mentioned problems and which guarantees convenient use and correct sensing.

SUMMARY OF THE INVENTION

Accordingly, the present invention has been made to solve the above-mentioned problems occurring in the prior art, and the present invention provides a valve opening degree sensing device capable of easily determining the upper and lower limits without using upper and lower limit switches so that, besides simplifying the mechanical structure, the device can be easily installed, maintained, and repaired.

The present invention also provides a valve opening degree sensing device capable of suppressing basic errors and improving the opening degree sensing performance without using upper and lower limit switches, cams, and a spline so that, by simplifying the mechanical structure, the device can be manufactured, installed, maintained, and repaired at a low cost, and its long-term durability is improved.

The present invention also provides a valve opening degree sensing device having a main gear adapted to disengage from the meter gear when the main gear is rotated excessively so that any damage to the meter gear and potentiometer, which may occur during installation or use, is prevented.

In accordance with an aspect of the present invention, there is provided a device for sensing an opening degree of a valve installed inside a fluid transfer pipe to control a flow rate of a fluid, the device including a case defining an inner space; a shaft extending through the case to be exposed in the space, the shaft transmitting a movement of the valve by means of rotation; a main gear installed inside the case and coupled around the shaft; a potentiometer including a meter gear installed to engage with the main gear and rotate and a meter for converting rotation of the meter gear into an electric signal; and a control circuit board including an operation unit for receiving an input of a command, a control circuit, and a band gap setting means, wherein the control circuit receives the electric signal from the potentiometer and sets limit values based on the input, the limit values including upper and lower limit values, the upper limit value corresponding to a position of the valve in a fully open condition and to a maximum flow rate of the fluid, the lower limit value corresponding to a position of the valve in a closed condition and to a minimum or zero flow rate of the fluid, the control circuit converts the electric signal between the upper and lower limit values at a predetermined proportion to calculate a degree of opening, and the band gap setting means enables the control circuit to recognize an angle or a position near the limit values as one of the fully open and closed conditions.

The valve opening degree sensing device according to the present invention is advantageous in that it can easily determine the upper and lower limits without using upper and lower limit switches so that, besides simplifying the mechanical structure, the device can be easily installed, maintained, and repaired.

The inventive device can avoid basic errors and improve the opening degree sensing performance without using upper and lower limit switches, cams, and a spline so that, by simplifying the mechanical structure, the device can be manufactured, installed, maintained, and repaired at a low cost, and its long-term durability is improved.

The inventive device has a main gear adapted to disengage from the meter gear when the main gear is rotated excessively so that any damage to the meter gear and potentiometer, which may occur during installation or use, is prevented.

BRIEF DESCRIPTION OF THE DRAWINGS

The above and other objects, features and advantages of the present invention will be more apparent from the following detailed description taken in conjunction with the accompanying drawings, in which:

FIG. 4 is an exploded perspective view of the valve opening degree sensing device according to the present invention;

FIG. 5 is a top view of the valve opening degree sensing device with the beacon and upper case removed;

FIG. 6 is a lateral sectional view taken along A-A' of FIG. 5;

DETAILED DESCRIPTION OF THE EXEMPLARY EMBODIMENTS

Figure 1:
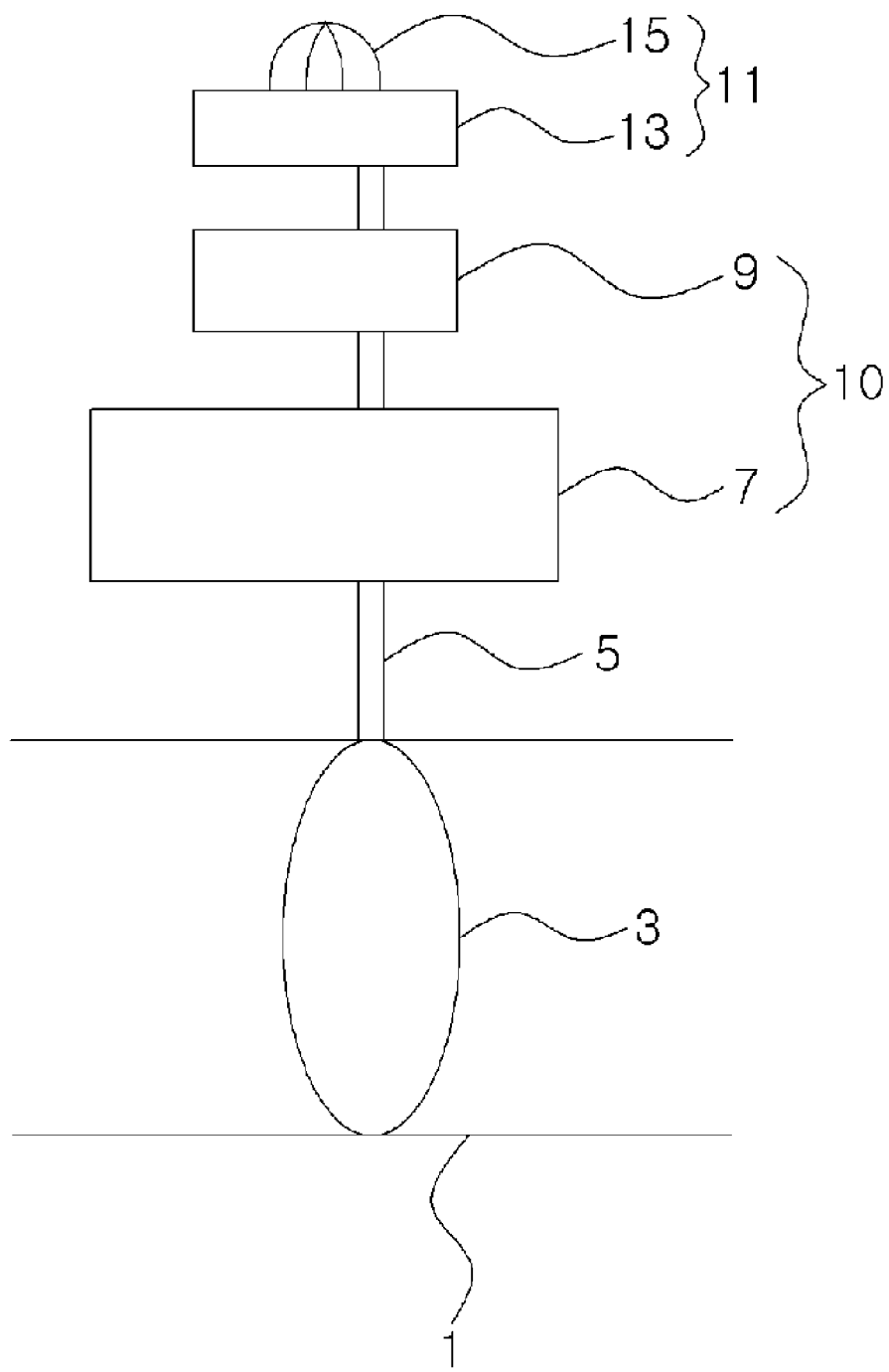
FIG. 1 shows the brief construction of a conventional valve, a valve driving device, and an opening degree device.
Figure 2:
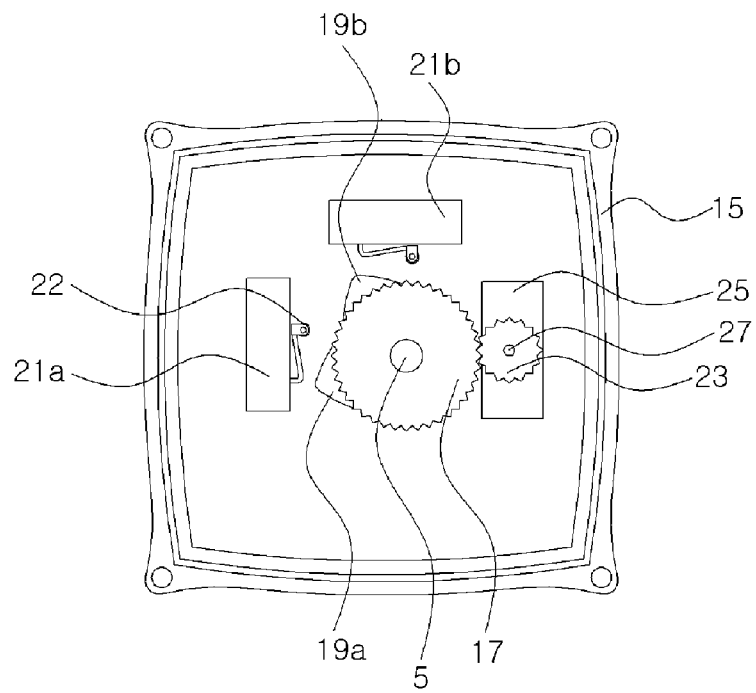
FIG. 2 is a top view briefly showing the interior of the opening degree sensing device.
Figure 3:
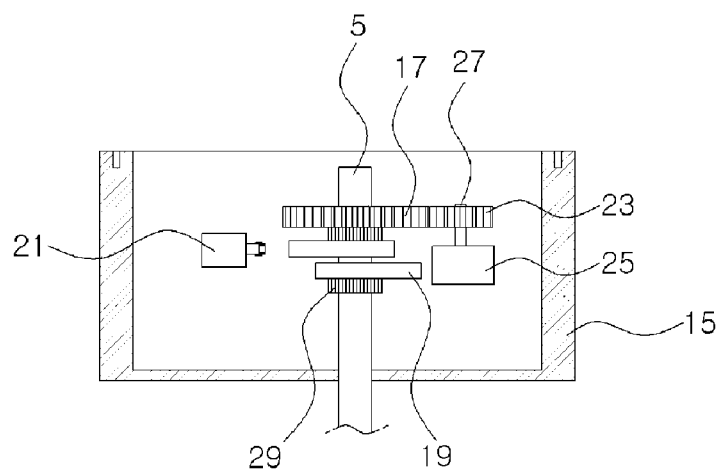
FIG. 3 is a lateral view briefly showing the interior of the opening degree sensing device.

Hereinafter, an exemplary embodiment of the present invention will be described with reference to the accompanying drawings. In the following description and drawings, the same reference numerals are used to designate the same or similar components, and so repetition of the description on the same or similar components will be omitted. Further, in the following description of the present invention, a detailed description of known functions and configurations incorporated herein will be omitted when it may make the subject matter of the present invention unclear. Those skilled in the art can easily understand that specific features shown in the drawings are enlarged for easier understanding, and not all components are shown to scale in the drawings.

It will be assumed in the following description of the present invention that the valve opening degree sensing device according to the present invention is used to sense the opening degree of a valve having a rotational angle of about 90° (i.e. quarter turn). It will also be assumed that the valve opening degree sensing device according to the present invention is used to sense the opening degree of a valve for controlling the flow rate. However, the field of application is not limited to this assumption, and the valve opening degree sensing device according to the present invention is applicable in any field by coupling the device to a shaft, which transmits rotation, to position and control another device, which is connected to the shaft, as the shaft rotates.

Figure 4:
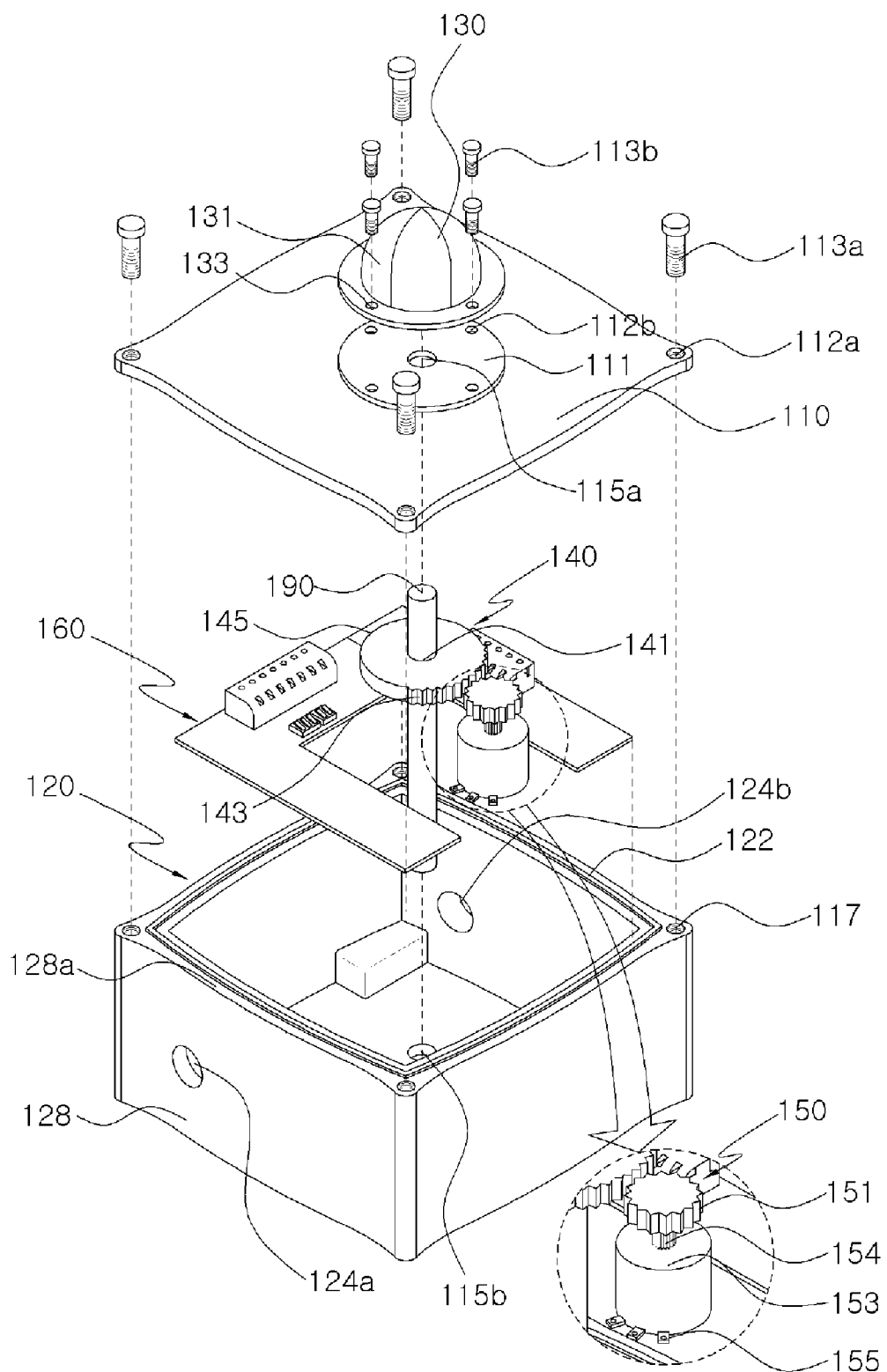
FIGS. 4-6 show a valve opening degree sensing device according to an embodiment of the present invention, particularly.
Figure 5:
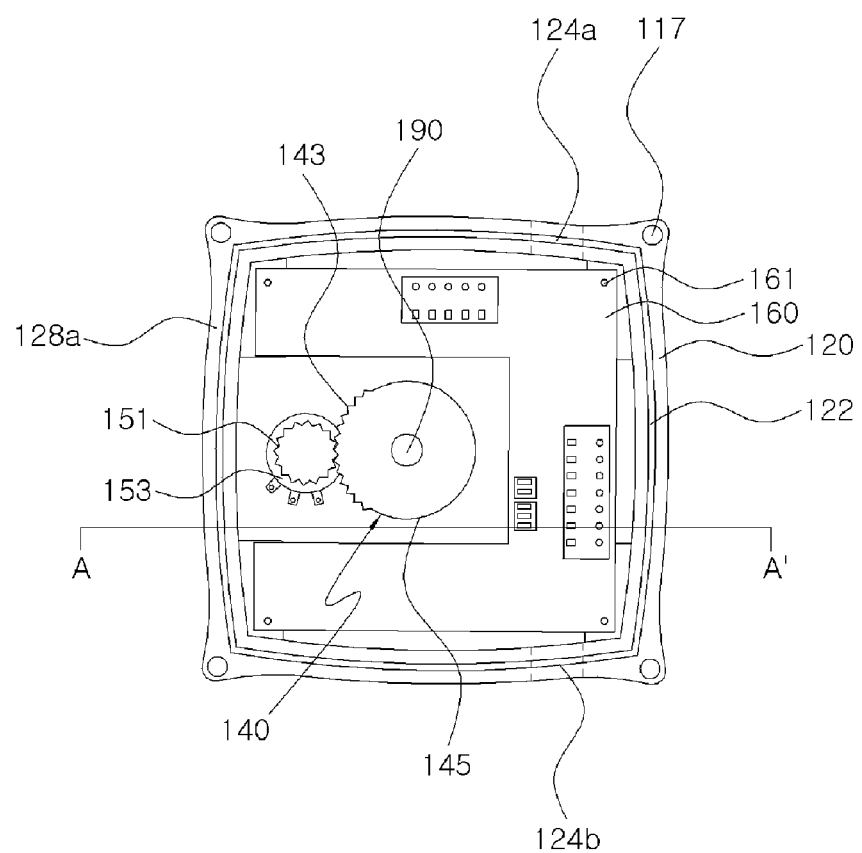
Figure 6:
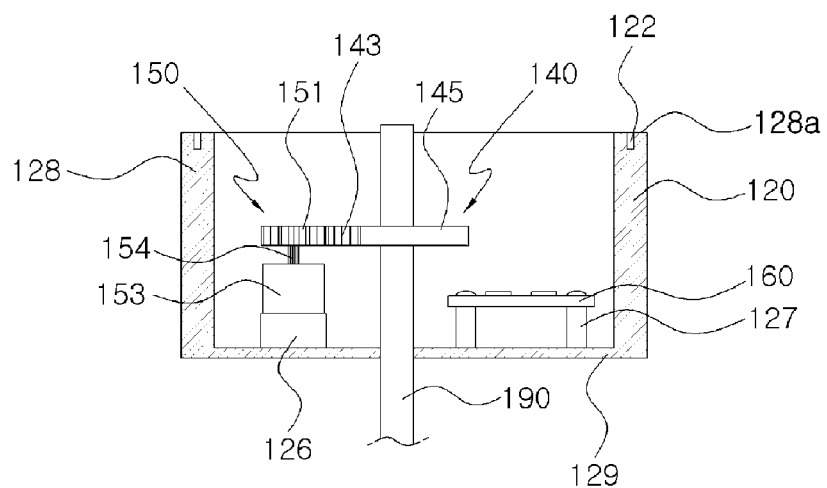

FIGS. 4-6 show a valve opening degree sensing device according to an embodiment of the present invention. Particularly, FIG. 4 is an exploded perspective view of the valve opening degree sensing device according to the present invention; FIG. 5 is a top view of the valve opening degree sensing device with the beacon and upper case removed; and FIG. 6 is a lateral sectional view taken along A-A' of FIG. 5.

Referring to FIGS. 4-6, the valve opening degree sensing device according to the present invention includes an upper case 110, a lower case 120, a main gear 140, a potentiometer 150, and a control circuit board 160. The valve opening degree sensing device according to the present invention may further include a beacon 130.

The upper and lower cases 110 and 120 together define an inner space, in which the main gear 140, the potentiometer 150, and the control circuit board 160 are contained and retained. The upper case 110 may be provided with a beacon 130 so that the user can easily recognize by the naked eye whether the valve is open or closed. It will be assumed in the following description that the valve opening degree sensing device according to the present invention includes a beacon 130. However, the beacon 130 may be omitted if necessary, and the installation position may differ from the illustrated one. The upper case 110 may be made of metal, synthetic resin, or an equivalent thereof. When metal is used, the upper case 110 can be fabricated by casting. However, the present invention is not limited to this example. The upper case 110 has a number of coupling holes 112a formed on portions to be coupled to the lower case 120, and anchors 113a are fastened to the coupling holes 112a so that the anchors 113a extend through the coupling holes 112a and couple to coupling holes 117 of the lower case 120. The upper case 110 may be provided with a beacon seating portion 111 so that the beacon 130 can be installed thereon. According to an embodiment of the present invention, the beacon 130 is coupled to an end of the shaft 190 to rotate an indicator (not shown) as the shaft 190 rotates, thereby indicating whether the valve is open or not. A shaft hole 115a is formed on the beacon seating portion 111 so that the shaft 190 extends through and couples to the beacon 130. A number of beacon fixing holes 112b are formed on the beacon seating portion 111 of the upper case 110 to fix the beacon 130. An O-ring (not shown) may be arranged at the junction between the upper and lower cases 110 and 120 for sealing.

The lower case 120 defines a space together with the upper space 110 so that the main gear 140, the potentiometer 150, and the control circuit board 160 are contained in the space. To this end, the lower case 120 has a shaft hole 115b formed thereon so that the shaft 190 extends through the bottom 129 and is exposed inside the space. Retaining blocks 126 and 127 are formed on the bottom 129 of the lower case 120 and inside the lower case 120 to retain the potentiometer 150 and the control circuit board 160. An O-ring groove 122 may be formed on the upper end 128a of the wall 128 of the lower case 120 so that an O-ring (not shown) can be installed thereon. However, the present invention is not limited to this configuration. At least one wiring hole 124 (124a and 124b) may be formed on the lower case 120 so that power and signal lines can extend into and out of the lower case 120.

The main gear 140 is installed on the shaft 190, which is exposed inside the case 109 (110 and 120), and rotates about the shaft 190 as the shaft 190 rotates, so that rotation of the shaft 190 is transmitted to the potentiometer 150. To this end, the main gear 140 has a toothed shape so that it engages with the meter gear 151 of the potentiometer 150, as shown in FIG. 6. Particularly, the main gear 140 of the valve opening degree sensing device according to the present invention has a structure for protecting the potentiometer 150. For example, teeth are formed on a part of the main gear 140. Alternatively, a recess is formed in a predetermined range. FIGS. 4-6 show exemplary teeth formed on a limited portion of the disk of the main gear 140 so that the main gear 140 is divided into a toothed portion 143, on which teeth are formed, and an arcuate portion 145, on which no teeth are formed. Various shapes of the main gear 140 and methods for protecting the potentiometer 140 will be described later in more detail with reference to corresponding drawings.

The potentiometer 150 converts the rotation of the valve, which is transmitted via the shaft 190, into an electric signal and transmits it to the control circuit board 160. To this end, the potentiometer 150 includes a meter gear 151 and a meter 153. The meter gear 151 is installed to engage with the main gear 140, and rotates about the rotator 154 of the meter 153 as the main gear 140 rotates. The meter 153 converts the rotation of the meter gear 151 into an electric signal. To this end, the meter 153 generally consists of a variable resistor and an equivalent device. The meter 153 is provided with a ground voltage Vg and a reference voltage Vref via a terminal 155. As the meter 153 rotates, a voltage between the ground voltage Vg and the reference voltage Vref is outputted and transmitted to the control circuit board 160. To this end, if the meter 153 consists of a variable resistor, three terminals are installed as shown in FIG. 4. The ground voltage Vg and the reference voltage Vref may be 0V and a predetermined number of volt, respectively, but the present invention is not limited to these values, and desired voltage values can be determined and used. However, it will be assumed for a convenient description of an embodiment of the present invention that the ground voltage Vg is 0V, and the reference voltage Vref is 2.5V. Although the potentiometer 150 is assumably installed on the meter retaining block 126 of the lower case 120, the present invention is not limited to this position of installation.

The control circuit board 160 converts and outputs the electric signal, which has been detected and converted by the potentiometer 150, and sets and processes a function related to the valve opening degree, which is necessary to drive the valve. To be more specific, the control circuit board 160 outputs and provides the valve's fully open and closed conditions and the degree of opening. To this end, the control circuit board 160 converts an APS (position signal) provided by the potentiometer 150 into a proportion of 0-100% and outputs it in various types. The control circuit board 160 sets upper and lower limits based on the user's input so that the valve operation can be controlled easily, and applies a band gap regarding the settings to output and provide information regarding the degree of opening of the valve. In order to increase the range of application of the valve opening degree sensing device and improve user convenience, the control circuit board 160 not only outputs information regarding the opening degree and settings via a display device, but also processes and outputs the APS in either analog or digital format according to the user's need. To this end, the control circuit board 160 internally converts the APS (analog electric signal) into a DPS (digital position signal) and processes it. The control circuit board 160 again converts the DPS into analog output data and digital output data and outputs them. To this end, the control circuit board 160 is provided with a circuit concerning a signal input unit, a control unit, an output unit, a power unit, and an optional operation unit for setting. The control circuit board 160 may consist of electric devices mounted on a PCB, and may be installed and retained on the board retaining block 127 of the lower case 120. The control circuit board 160 will be described later in more detail with reference to corresponding drawings.

The beacon 130 is installed on the case 109 of the valve opening degree sensing device so that the user can easily observe the degree of opening of the valve by the naked eye. The beacon 130 exactly reflects the movement of the shaft 190 and indicates the degree of opening of the valve. To this end, the beacon 130 is coupled to an end of the shaft 190 so that, as the shaft rotates 190, the internal indicator (not shown) is rotated and exposed to indicate the degree of opening. Although it is assumed in the description of an embodiment of the present invention that the beacon 130 is coupled to the beacon seating portion 111 of the upper case 110, the present invention is not limited to this configuration.

Figure 7:
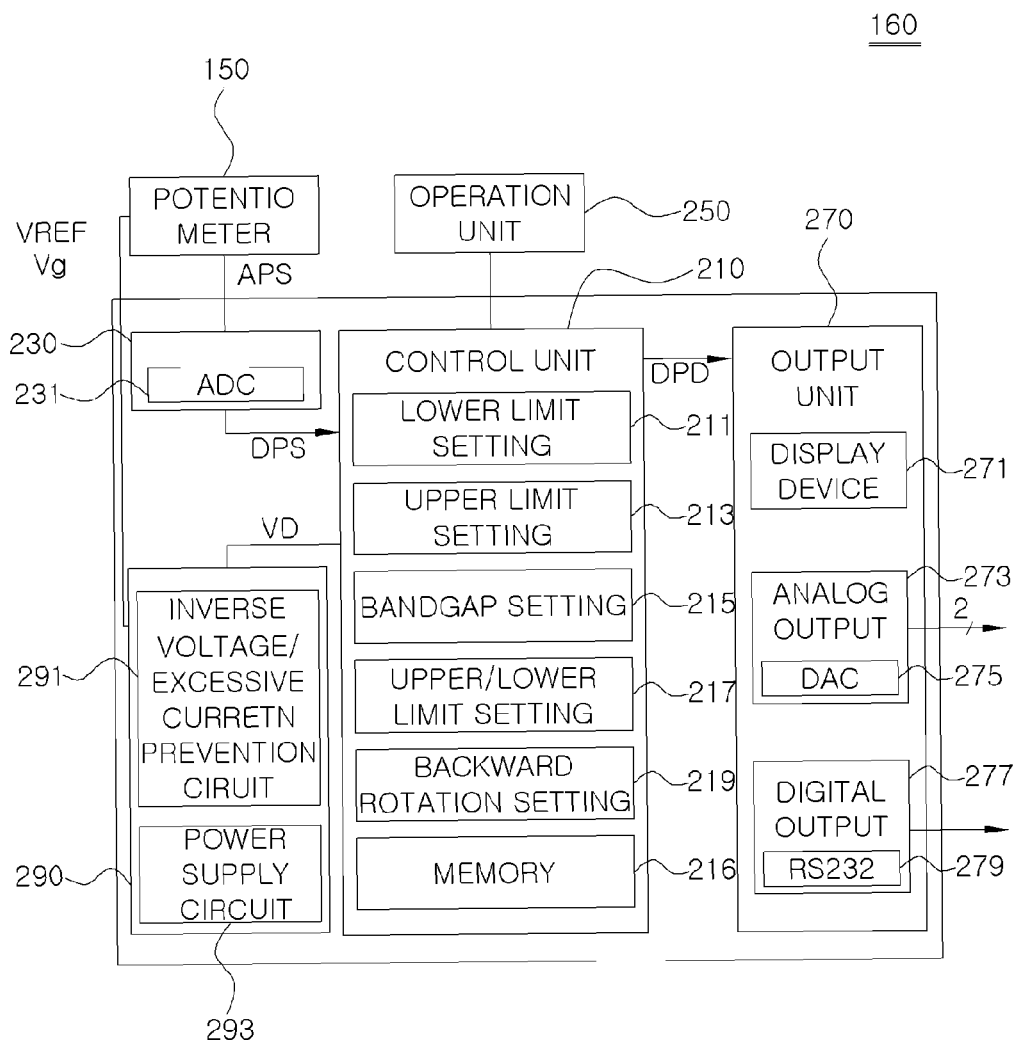
FIG. 7 is a block diagram showing the operation and construction of a control circuit board.

FIG. 7 is a block diagram showing the operation and construction of the control circuit board.

Referring to FIG. 7, the control circuit board 160 may include a number of electric devices mounted on a PCB, as mentioned above. The control circuit board 160 is basically adapted to convert the degree of opening of the valve, which has been sensed by the potentiometer 150, into a signal desired by the user, output the signal, and provide the exact valve condition for easy control. To this end, the control circuit board 160 includes a control unit 210, a signal input unit 230, an operation unit 250, an output unit 270, and a power unit 290, as mentioned above.

The signal input unit 230 receives an APS from the potentiometer 150, converts it into a DPS, and transmits it to the control unit. To this end, the signal input unit 230 is electrically connected to the potentiometer 150 and the control unit 210, and includes an analog/digital converter for signal conversion.

The control unit 210 internally processes the DPS, which is inputted via the signal input unit 230, into DPD (position data), and outputs it via the output unit 270. Particularly, the control unit 210 sets the upper and lower limits of the valve opening degree, as well as a band gap related thereto, according to the user's setting input made via the operation unit 250, and outputs DPD reflecting the valve opening degree. The control unit 210 is adapted to reset the upper and lower limits and the band gap determined by the user's setting input in various situations requiring initialization (e.g. reinstallation of the sensing device, correction of the error ratio). The control unit 210 may include a memory 216 for storing setting data, including the user's setting, the band gap, and upper and lower limit settings. Those skilled in the art can understand that the memory 216 does not necessarily belong to the control unit 210, and may be mounted on any portion of the control circuit board 160 as long as it can provide setting data at a call of the control unit 210. The control unit 210 may consist of an operating device (e.g. micro control unit), but the present invention is not limited to this example.

The operation unit 250 receives a setting input, including upper and lower limit settings, band gap settings, forward/backward rotation settings, upper and lower limit reset, and output adjustment, from the user and transmits it to the control unit 210. The operation unit 250 may include a switch, a keypad, and an equivalent device thereof. For example, a three-pole dip switch may be used to set the band gap in the range of 1-8% (the unit size is 1%). However, the present invention is not limited to this value. The operation unit 250 may consist of a small switch installed on the control circuit board 160; it may be installed on a separate control panel; or it may be installed on both the control circuit board 160 and a control panel (not shown).

The output unit 270 outputs DPD, which is provided via the control unit 210. Particularly, the output unit 270 outputs and provides both analog and digital signals to provide various devices (e.g. existing devices and remote control devices) with DPD. The output unit 270 can output and provide DPD to the user via a display device 271 including an LED (Light Emitting Device), an LCD (Liquid Crystal Display), and an equivalent device thereof. The display device 271 may be installed on a separate control panel (not shown) or outside the opening degree sensing device. However, the present invention is not limited to this position of installation. The output unit 270 may include an analog output unit 275 for analog output of the DPD. The analog output unit 275 may further include a DAC (digital/analog converter) 275 for converting the DPD into analog data. The analog position data outputted by the analog output unit 275 may be a current signal having a signal range of 4-20 mA. It is also possible to supply two-channel signals for easy application to existing devices. However, the present invention is not limited to this configuration. The digital output unit 277 of the output unit 270 may include an RS232 (serial communication module) 279 for serial communication. The digital output unit 277 may be adapted to transmit DPD to the outside by wireless data communication (e.g. Bluetooth, Zigbee), but the present invention is not limited to this feature.

The power unit 290 converts power, which is supplied from outside, into VD (operating power), which is necessary to operate the control unit 210, signal input unit 230, operation unit 250, and output unit 270, and supplies the VD. Those skilled in the art can understand that, although FIG. 7 shows the VD supplied to the control unit 210 only, the VD is also supplied to the signal input unit 230, the operation unit 250, and the output unit 270, the interconnection of which is omitted for clarity. The power unit 290 provides the potentiometer 150 with a reference voltage Vref and a ground voltage Vg. For the sake of this power supply, the power unit 290 includes a power supply circuit 293 and an optional inverse voltage/excessive prevention circuit 291 for preventing circuit damage caused by inverse voltages and excessive currents. However, the present invention is not limited to this configuration.

The operation of the valve opening degree sensing device according to the present invention will now be described in more detail. When the inventive valve opening degree sensing device is applied to a quarter turn valve, the degree of opening of the valve is converted and outputted as a percentage (i.e. the unit size is 1%, the range is 0-100%). The conversion unit can be determined by the user based on the precision of the valve and the sensing device. Although it is customary to indicate the degree of opening in the range of 0-90° in the case of application to actual valve driving, the opening degree sensing device according to the present invention indicates the degree of opening in the range of −5° to 95° so that mechanical errors are compensated for. If the angle is converted into a percentage in this case, 1% corresponds to a value of about 1°.

When the valve and the opening degree sensing device are applied to a valve driving device employing an actuator, initial values corresponding to fully open and closed conditions (i.e. upper and lower limits) must be set to correctly determine the valve stroke based on consideration of the inner diameter of the fluid passage, inside which the control target valve is operated. The upper and lower limits are set by the operator, who installs the valve and the opening degree device, while moving the valve from the fully open condition to the closed condition, or vice versa. A separate metering device (e.g. flowmeter) may be used to determine whether the valve is in the fully open condition or the closed condition. Particularly, the user moves the valve to the fully open and closed conditions, respectively, and presses the upper and lower limit setting switches positioned on the control circuit board 160. The control unit 210 then recognizes the pressing operations and defines the angles, at which the switches are pressed, as the upper and lower limits, respectively, which are stored in the memory 216. The upper and lower limits set in this manner prevent the user from rotating the valve more than is necessary and damaging the valve and its driving device.

The upper and lower limits are preferably determined within 25% ranges, i.e. −5° to 20° and 75° to 95°, respectively. The valve fails to work precisely outside the determined ranges of upper and lower limits. For example, outside the determined ranges of upper and lower limits, electric signals measured by the potentiometer 150 are converted in a narrow detection range. This requires a complicated and detailed conversion circuit, and increases the manufacturing and maintenance costs. Assuming for example that the reference voltage Vref and ground voltage Vg supplied to the potentiometer 150 have a range of 0-2.5V, and that the upper and lower limits are in 25% ranges, the actually measurable area is in a range of 0.625-1.875V, and 1° of rotation of the valve corresponds to 0.0125V. This means that the rotational angle of the valve must be calculated with difficulty by detecting a voltage in a range corresponds to half the entire voltage range of 0-2.5V. Therefore, the opening degree sensing device according to the present invention outputs an error message to the user if the upper and lower limits deviate the determined ranges, and requests the user to check or reset the valve and the driving device.

It has been assumed in the above description that the unit size of the valve angle measured by the valve opening degree sensing device is 1%. However, mechanical devices often have nonlinear operation sections, in which linear metering is of little value. For example, if the valve angle is about 0 or 90°, rotation of the valve by 1° hardly affects the flow rate of the fluid inside the pipe. This means that valve opening degree control is substantially unnecessary in sections near the upper and lower limits. Therefore, the present invention sets a band gap, and an angle corresponding to the band gap is recognized as the fully open or closed condition. Then, position data corresponding to the fully open or closed condition is transmitted to the outside to prevent unnecessary valve driving. This can also partially correct mechanical errors near 0 or 90°. The band gap can be easily set by the above-mentioned three-pole dip switch. A single-pole dip switch can select conditions in two stages, and a combination of three enables adjustment in eight separate stages. Those skilled in the art can modify the number of dip switches as desired, and the band gap is not necessarily set by dip switches.

Figure 8:
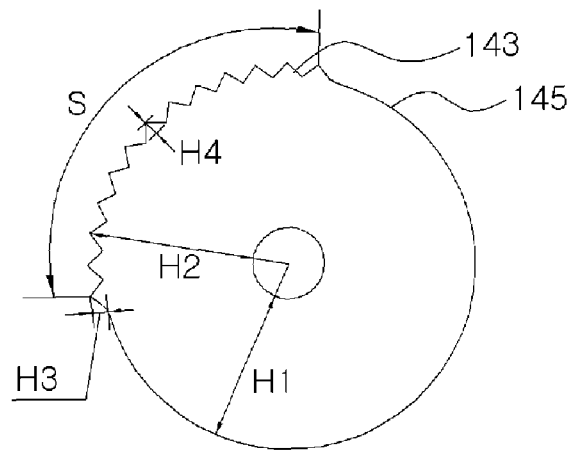
FIGS. 8-10 show exemplary shapes of the main gear of the valve opening degree sensing device according to the present invention.
Figure 9:
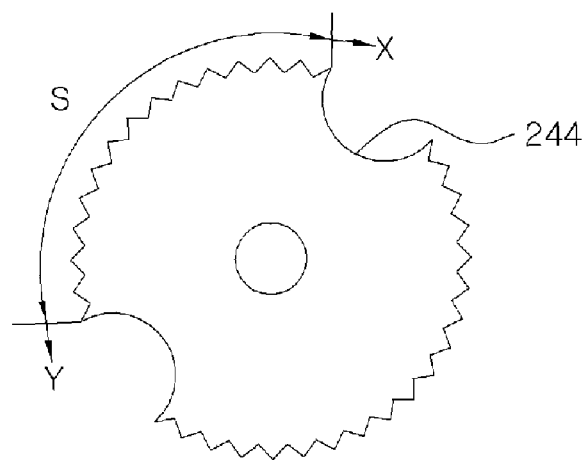
Figure 10:
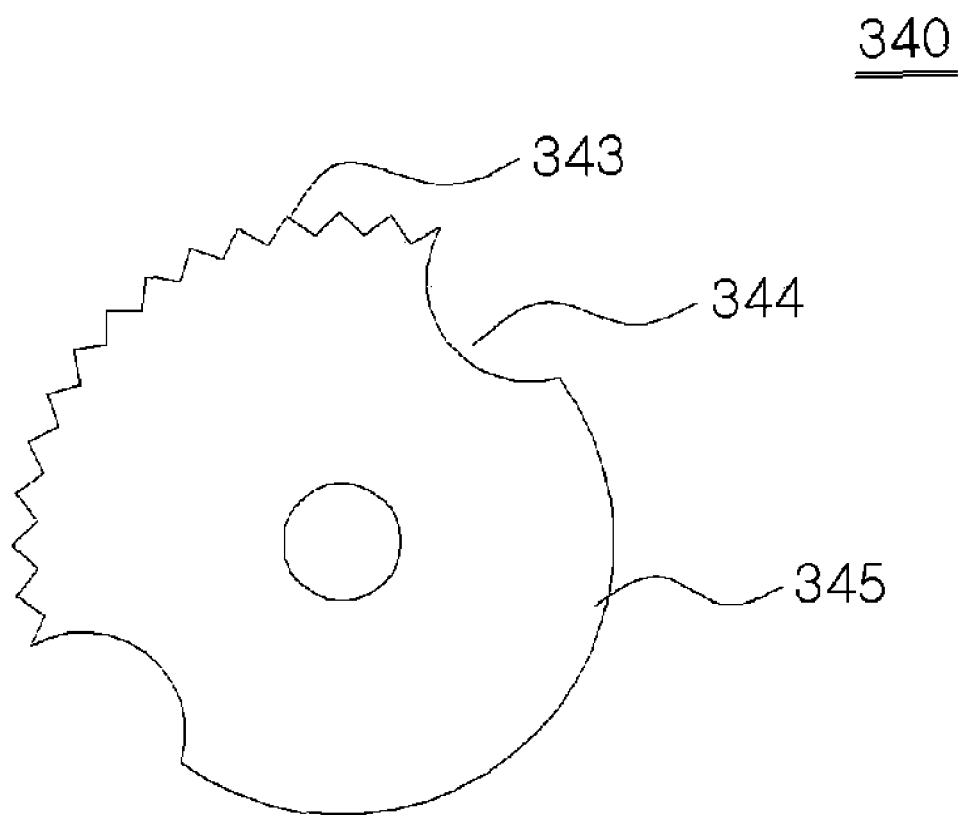

FIGS. 8-10 show exemplary shapes of the main gear of the valve opening degree sensing device according to the present invention.

FIG. 8 shows an exemplary main gear having a toothed portion 143 and an arcuate portion 145. The toothed portion 143 engages with the meter gear 151 and rotates it as the shaft 190 rotates. To this end, the toothed portion 143 has the same number of teeth as the meter gear 151. Particularly, the toothed portion 143 of the main gear shown in FIG. 8, on which teeth are formed, has a length S corresponding to the necessary range of rotation of the meter gear 151. More particularly, the meter gear 151 used for the potentiometer 150 generally has a diameter smaller than that of the main gear 143, and the gear ratio is determined so that, as the main gear 140 rotates once, the meter gear 151 rotates more than once. Considering that the meter 153 limits the rotation of the meter gear 151, the toothed portion 143 of the main gear 140, which is necessary to rotate the meter gear 151, has a limited length S. In other words, the length S of the toothed portion 143 is equal to or larger than the length necessary to drive the meter gear 151, i.e. the operation length of the meter gear 151.

The main gear 140 show in FIG. 8 has an arcuate portion 145, on which no teeth are formed. The arcuate portion 145 has a radius Hi smaller than the radius H2 of the toothed portion 143. The difference H3 in diameter between the toothed portion 143 and the arcuate portion 145 is equal to or larger than the length H4 of the teeth. This guarantees that, if the meter gear 151 disengages from the toothed portion 143 of the main gear 140, the deviation from the operation limit of the meter gear 151 does not damage the meter gear 151 and the potentiometer 150. In other words, once the operation length is exceeded, the meter gear 151 disengages. Particularly, if the main gear 140 is rotated beyond the necessary rotational angle due to malfunctioning of the valve device, for example, the arcuate portion 145 causes the meter gear 151 and the main gear 140 to disengage from each other so that, even if the main gear 140 rotates, the meter gear 151 does not rotate. This protects the meter gear 151 and the meter 153 from excessive rotation of the main gear 140. Those skilled in the art can understand that the arcuate portion 145 does not necessary have the shape of an arc or a fan, and it is also possible to remove portions other than the portion for coupling with the toothed portion 143 and the shaft 190, or to form and use an angled portion (e.g. triangle, square). However, the present invention is not limited to this configuration.

FIG. 9 shows an exemplary main gear 240 having a crescent 244. The configuration shown in FIG. 9 is useful when it is not easy to form an arcuate portion 145, and can be easily applied to a pre-fabricated product. The crescent 244 is adapted to protect the meter gear 151. More particularly, the crescent 244 protects the meter gear 151 from excessive rotation of the main gear 140 as in the case of the above-mentioned arcuate portion 145. If the main gear 140 is rotated beyond the operation range of the meter gear 151, the crescent 244 causes both gears to disengage from each other temporarily and protects the meter gear 151 and the meter 153 accordingly. At least one crescent 244 is formed on the circumference of the main gear 140 in a position where the main gear 140 and the meter gear 151 stop engaging with each other during normal rotation of the meter gear 151. Particularly, crescents 244 are formed before the initial point X, at which the meter gear 151 begins to rotate as the meter gear 151 and the main gear 140 engage with each other, and after the final point Y, at which the meter gear 151 stops rotating, respectively.

FIG. 10 shows an exemplary main gear having both a crescent 244 and an arcuate portion 345 formed thereon. In the case of the above-mentioned configuration shown in FIG. 9, a crescent 244 is formed on a pre-fabricated main gear 240 to temporarily protect the meter gear 151 and the meter 153 during gear driving. However, the main gear 140 may rotate further and move out of the range of the crescent 244. In order to protect the meter gear 151 and the meter 153 in such a case, an arcuate portion 345 is preferably formed on the gear 140, as shown in FIG. 8, or on the main gear 340, as shown in FIG. 10, to protect the potentiometer 150. Those skilled in the art can understand that FIG. 10 shows only an example of the main gears 140, 240, and 340, and the crescent 344 may be omitted when an arcuate portion 345 is formed.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A device for sensing an opening degree of a valve installed inside a fluid transfer pipe to control a flow rate of a fluid, the device comprising:
   a case defining an inner space;
   a shaft extending through the case to be exposed in the space, the shaft transmitting a movement of the valve by means of rotation;
   a main gear installed inside the case and coupled around the shaft;
   a potentiometer comprising a meter gear installed to engage with the main gear and rotate and a meter for converting rotation of the meter gear into an electric signal; and
   a control circuit board comprising an operation unit for receiving an input of a command, a control circuit, and a band gap setting means, wherein
   the control circuit receives the electric signal from the potentiometer and sets limit values based on the input and the electric signal from the potentiometer, the limit values comprising upper and lower limit values, the upper limit value corresponding to a position of the valve in a fully open condition and to a maximum flow rate of the fluid, the lower limit value corresponding to a position of the valve in a closed condition and to a minimum or zero flow rate of the fluid, the control circuit converts the electric signal between the upper and lower limit values at a predetermined proportion to calculate a degree of opening, and the band gap setting means enables the control circuit to recognize an angle or a position near the limit values as one of the fully open and closed conditions.

2. The device as claimed in claim 1, wherein the control circuit comprises:
   a signal input unit for converting the electric signal into a digital signal;
   a control unit for converting the digital signal from the signal input unit at a predetermined proportion to obtain digital position data;
   an output unit for outputting the digital position data;
   a power unit for supplying the potentiometer with power for creating the electric signal; and
   a memory for storing the limit values, and
   the output unit comprises one of an analog output unit for converting the digital position data into an analog position signal and outputting the signal, a digital output unit for outputting the digital position data by using data communication, and a display device for direct output of the digital position data.

3. The device as claimed in claim 1, wherein the main gear has a toothed portion having teeth formed in a limited portion of a circumferential surface of the main gear, the limited portion engaging with the meter gear to be driven, and an arcuate portion formed on a portion of the main gear excluding the toothed portion, the arcuate portion having no teeth, and the arcuate portion has a radius smaller than a radius of the toothed portion, or a crescent is formed at an interface between the toothed portion and the arcuate portion.

* * * * *